United States Patent
Peters

(10) Patent No.: US 7,877,685 B2
(45) Date of Patent: Jan. 25, 2011

(54) PERSISTENT ADJUSTABLE TEXT SELECTOR

(75) Inventor: Johan C Peters, Bad Schoenborn (NL)

(73) Assignee: SAP AG, Walldorf (DE)

( * ) Notice: Subject to any disclaimer, the term of this patent is extended or adjusted under 35 U.S.C. 154(b) by 1186 days.

(21) Appl. No.: 11/319,420

(22) Filed: Dec. 29, 2005

(65) Prior Publication Data

US 2007/0157085 A1 Jul. 5, 2007

(51) Int. Cl.
*G06F 17/24* (2006.01)

(52) U.S. Cl. ...................................... 715/272

(58) Field of Classification Search ................. 715/256, 715/860, 769, 770
See application file for complete search history.

(56) References Cited

U.S. PATENT DOCUMENTS

| | | | | |
|---|---|---|---|---|
| 5,523,775 | A * | 6/1996 | Capps | 345/179 |
| 5,561,444 | A * | 10/1996 | Johnston et al. | 715/860 |
| 5,664,210 | A * | 9/1997 | Fleming et al. | 715/246 |
| 5,760,773 | A * | 6/1998 | Berman et al. | 715/808 |
| 6,240,430 | B1 * | 5/2001 | Deike et al. | 715/210 |
| 6,683,631 | B2 * | 1/2004 | Carroll | 715/821 |
| 6,836,759 | B1 * | 12/2004 | Williamson et al. | 704/235 |
| 6,891,551 | B2 * | 5/2005 | Keely et al. | 715/762 |
| 7,032,171 | B1 * | 4/2006 | Carroll | 715/246 |
| 2002/0097270 | A1 * | 7/2002 | Keely et al. | 345/764 |
| 2004/0230907 | A1 * | 11/2004 | Yang | 715/530 |
| 2005/0076300 | A1 * | 4/2005 | Martinez | 715/539 |
| 2006/0005151 | A1 * | 1/2006 | Altman | 715/860 |
| 2006/0048074 | A1 * | 3/2006 | Klein | 715/811 |
| 2007/0067157 | A1 * | 3/2007 | Kaku et al. | 704/10 |

OTHER PUBLICATIONS

Smith et al., Sams Teach Yourself Adobe Acrobat 5 in 24 Hours; Sams Publishing, 2001, p. 165.*
Apperley et al., Breaking the Copy Paste Cycle: The Strechable Selection Tool, p. 1-8 (AUIC 2000, First Australasian User Interface Conference 2000, Jan. 31, 2000-Feb 3, 2000—Canberra, Australia).*
Apperley et al. The Strechable Selection Tool an Alternative to Copy and Paste, p. 195-209 (Elsevier Science BV, Interacting with Computers vol. 14, 2002).*
ADOBE Systems Inc., Adobe Acrobat 7.0.3, release Nov. 15, 2004.

* cited by examiner

*Primary Examiner*—Doug Hutton
*Assistant Examiner*—Frank D Mills
(74) *Attorney, Agent, or Firm*—Kenyon & Kenyon LLP

(57) ABSTRACT

Embodiments of the present invention provide a computer interface that allows for the amount of text selected using a text selection utility to be changed after the selection has been made. A user may make an initial selection, then later change the amount or portion of text that was selected using selection handles displayed on the selection.

14 Claims, 7 Drawing Sheets

Figure 1

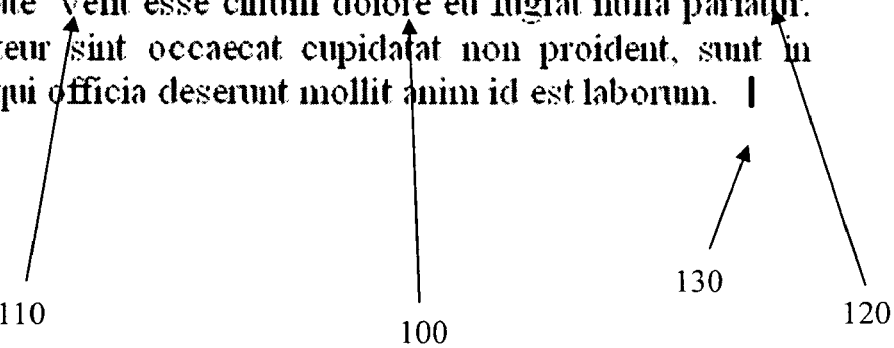

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

PERSISTENT ADJUSTABLE TEXT SELECTOR

BACKGROUND OF THE INVENTION

The present invention relates to text selection utilities featured in software programs such as word processors, page layout programs, graphics editing programs, and other software. Specifically, it relates to an improved text selection utility.

Many modern software packages include text manipulation tools that rely on a "text selection" feature in which a user to places a cursor within text and highlights or selects along the flow of the text. The selection often is continuous, but can only be done to the left or right of the insertion point. Once a new insertion point is selected (generally, when the cursor is moved), the previously-selected text becomes unselected. For example, when a selection of text is highlighted with a mouse, it can be manipulated as a selection. However, once the selection is completed, for example by clicking a mouse button, dragging to highlight text, and releasing the mouse button, it cannot be changed to include more or less text. As a further example, when the user later clicks a mouse button a second time, the selected text becomes unselected and can no longer be manipulated as a selection without being reselected by the user.

Standard text selection utilities allow for selection of text beginning from a starting insertion point. Text selection utilities may be provided by a software program, operating system, or other computer program to allow the user to indicate a portion of text that will be manipulated. The insertion point is selected by the user through means of positioning a cursor at a point within editable or selectable text. An insertion may be within or outside of an area of previously-selected text. The selection can then be expanded to the left or right of the insertion point, usually by clicking and dragging the cursor or pointer using an input device such as a mouse.

These text selection tools therefore often require users to make several attempts at selecting the precise text that is desired, and may prevent selection of desired text that spans multiple columns, pages, blocks, etc. A user may also be forced to select the same text repeatedly, when it is necessary to perform further operations on the selected text after the user edits non-selected text. There is therefore a need for a text-selection tool or utility that allows selection in any direction from the insertion point, and that results in a selection that does not become unselected if the insertion point or cursor is repositioned.

BRIEF DESCRIPTION OF THE DRAWINGS

FIG. 1 shows an embodiment of the present invention.

FIG. 2 is an enlarged view of an embodiment of the present invention.

DETAILED DESCRIPTION

Figure 3:
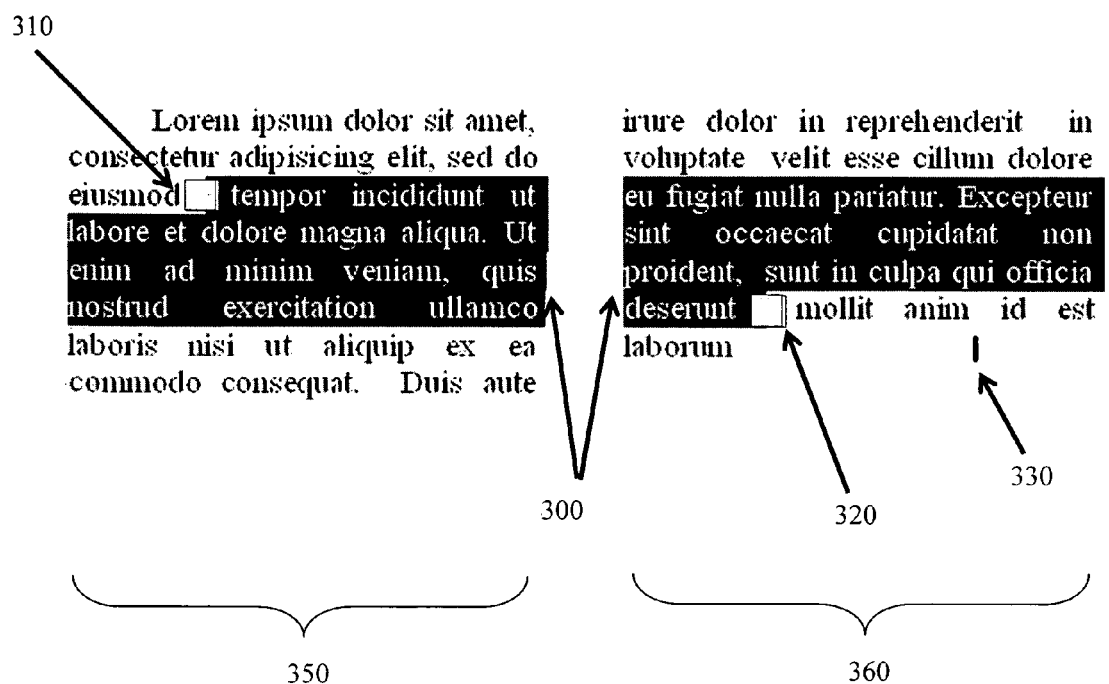
FIG. 3 is an enlarged view of an embodiment of the present invention.

Embodiments of the present invention provide a computer interface that allows for the amount of text selected using a text selection utility to be changed after the selection has been made. A user may make an initial selection, then later change the amount or portion of text that was selected using selection handles displayed on the selection. Some embodiments may also allow a user to manipulate text that was not selected without causing the selected text to become unselected.

Embodiments of the present invention permit a user to adjust a selection of text after it has been selected. In one embodiment of the invention, illustrated in FIG. 1, after selection 100 is selected, "handles" 110 and 120 are displayed on each side of selection 100. Initial selection 100 may be made, for example, by a conventional click and drag operation. Typically, an operator positions the mouse pointer at the desired insertion point and clicks the mouse button. The mouse button may then be held down as the mouse cursor is moved to highlight the desired selection. The selection is "completed" once the mouse button is released. Other selection techniques are known.

Once selection 100 is completed, handles 110 and 120 are displayed. The user may then select and move handles 110 and 120 in order to change the size and shape of selection 100. During the process of adjusting selection 100, text cursor 130 may remain in its initial location. In another embodiment, the system may provide a means for the user to indicate whether inputs, such as those from a mouse or keyboard, should be directed to moving text cursor 130 or manipulating selection handles 110 and 120.

FIG. 2 illustrates another embodiment of the present invention. Selection 100 has been selected as described above. Handle 110 is selected with the mouse pointer (not shown). The mouse pointer may change shape in order to indicate to the user that clicking the button will allow manipulation of that side of selection 100. For example, the mouse pointer may change to a four-arrow shape 200. The user may then manipulate handle 110, for example by clicking and dragging using a mouse, in order to change the size of selection 100 to include more, less, or different text. The user may similarly manipulate handle 120 in order to change the location of the right side of the selection. Handles may be displayed at portions of the selection other than the endpoints. For example, a handle 210 may be in a central portion of the selection to allow for the selection to be altered vertically.

Cursor 130 may be positioned after selection 100 is made, and further editing functions may be used. In some embodiments, selection 100 may be persistent and remain selected until the user indicates that it is no longer desired. That is, the text may remain highlighted and available for use as a selection until the user indicates it is not desired. Such an indication may consist of selecting a new insertion point and creating a new selection using, for example, the methods described above. The system may provide other means for the user to indicate when a selection is no longer desired.

The present invention may further allow a user to re-select a previously-selected portion of text. In some embodiments, a selection history may be provided that lists previous selections made by the user. A selection history may store and display a list or other representation of previously-made selections. The history may include, for example, a specific number of previous selections, or the selections made within a certain period of time. A selection history may refer to a list of previously made selections, which can be chosen by the user in order to re-select previously-selected text. By choosing a previous selection, the previously-selected text may become selected again. The present invention may include a means of indicating the status of a previous selection. For example, if a user attempts to re-select text that has been deleted since the selection was originally made, the system may indicate that the exact selection is unavailable. Such indication may be made in a graphical representation of the selection history. The status of each selection in the selection history may be updated as the user manipulates text within the system. Some embodiments may allow for multiple selections to be persistent. Multiple selections may be merged into one selection, for example when multiple selections overlap.

Further embodiments of the present invention provide for a persistent, adjustable selection that spans multiple columns, paragraphs, pages or other functional, logical, or visual blocks. FIG. 3 illustrates one such embodiment. Columns 350 and 360 represent visual blocks of a document. Selection 300 has been expanded to column 360 from column 350 to include text from both columns. Cursor 330 may be used to continue editing text within or outside of selection 300. Selection 300 may be persistent, allowing the selection to remain until the user indicates it is no longer desired. Such use as is known in the art may be made of selection 300 prior to or following further editing of text.

Selection 300 and handles 310 and 320 may select text within the normal "flow" of the text. That is, they may allow selection of text in the order in which it would be read. Alternatively, they may follow page layout, outline levels, or other methods of separating text. The selection and handles may also be used to select text independent of visual, logical, or other organizational structures defined by the software in which the selection tool is used. In some embodiments, the user may specify whether the selection should follow the normal flow of text, other structures, or no structures.

Figure 4:
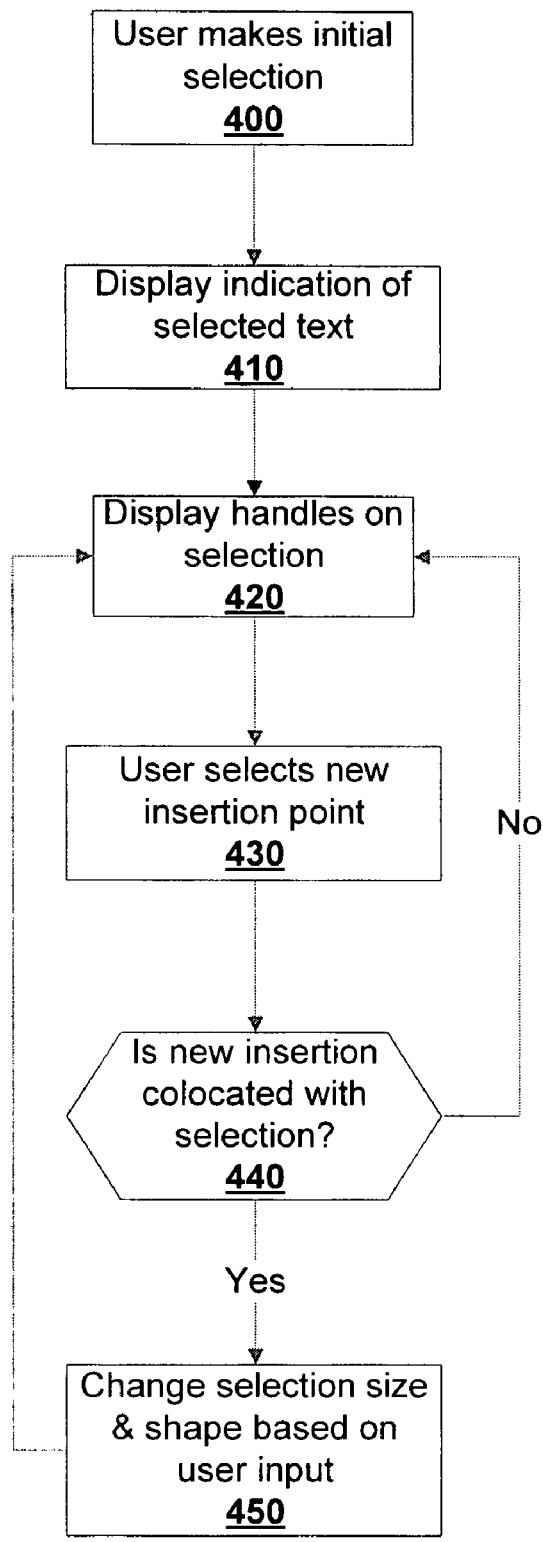
FIGS. 4-6 are flowcharts showing embodiments of the present invention.

In another embodiment of the present invention, the text selection utility is a part of an executable program, such as an operating system or application. Such executable programs may include functionality dedicated to presentation of a user interface and interpretation of user input in association with the user interface. FIG. 4 shows an example flowchart of one such embodiment. The user may select and complete a first selection 400, for example as described above. The system then displays an indication 410 that the first selection is completed. Such an indication may include, for example, highlighting the selected text. The program may display a means for the user to further manipulate the selection 420, such as handles as described above. In some embodiments, at least two handles will be displayed. When the user selects a second insertion point 430, the program determines 440 if the second insertion point is co-located with the first selection or a portion of the first selection. If it is, the program may allow manipulation of the selection 450. In some embodiments, the program will allow the selection to be resized to include more text or exclude some previously-selected text if the second insertion is co-located with one of the handles.

Figure 5:
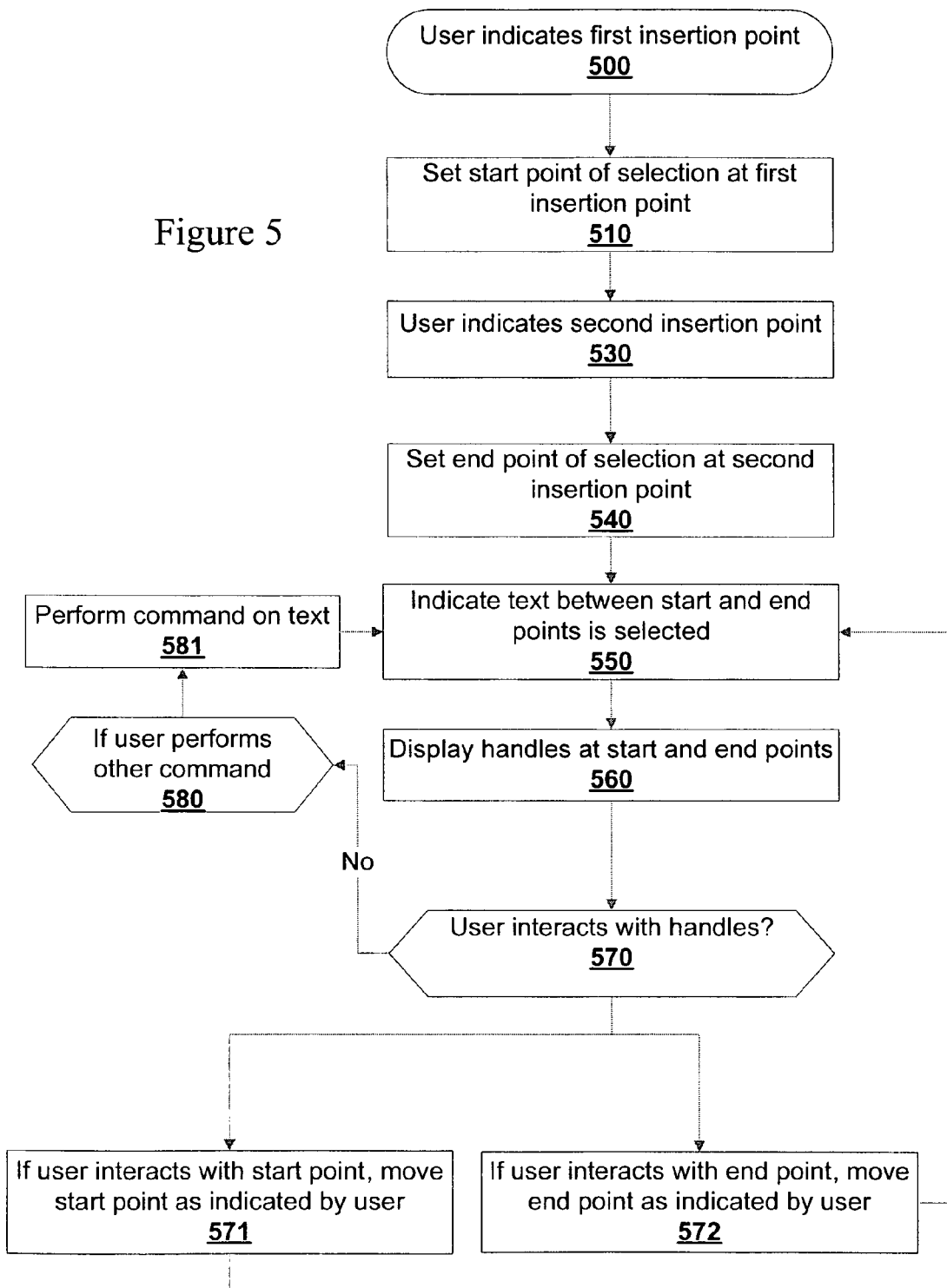

In another embodiment of the invention, the user may perform commands on the selected text after the initial selection has been made. A diagram of such an embodiment is shown in FIG. 5. The user selects a first insertion point 500, typically by clicking a mouse to select a cursor location. The start point of the selection is set to be the location of the first insertion point 510. The user similarly selects a second insertion point 530, which is set as the end point of the selection 540. The program then indicates that the selection has been completed 550, typically by highlighting the selected text in a different color. The program may display an interface for the user to manipulate the start and end point, for example by displaying handles 560 as described above. The program determines whether the user has interacted with either of the handles 570. Such interaction typically comprises positioning a mouse cursor over a handle and clicking a button on the mouse, but other means of interaction are possible. If the program determines that the user has interacted with the handle at the start point, the program repositions the start point as directed by the user 571. Similarly, if the user interacts with the handle at the end point, the program repositions the end point as directed 572. The modified selection is then indicated 550, typically by highlighting the text comprising the selection. If the user has performed a command which does not comprise interacting with either of the handles 580, the program may perform the command on the selected text 581. The selected text is then indicated 550, typically by highlighting. Commands performed by the user may result in changes to the highlighted text, for example deletions or movement of the selected text.

Figure 6:
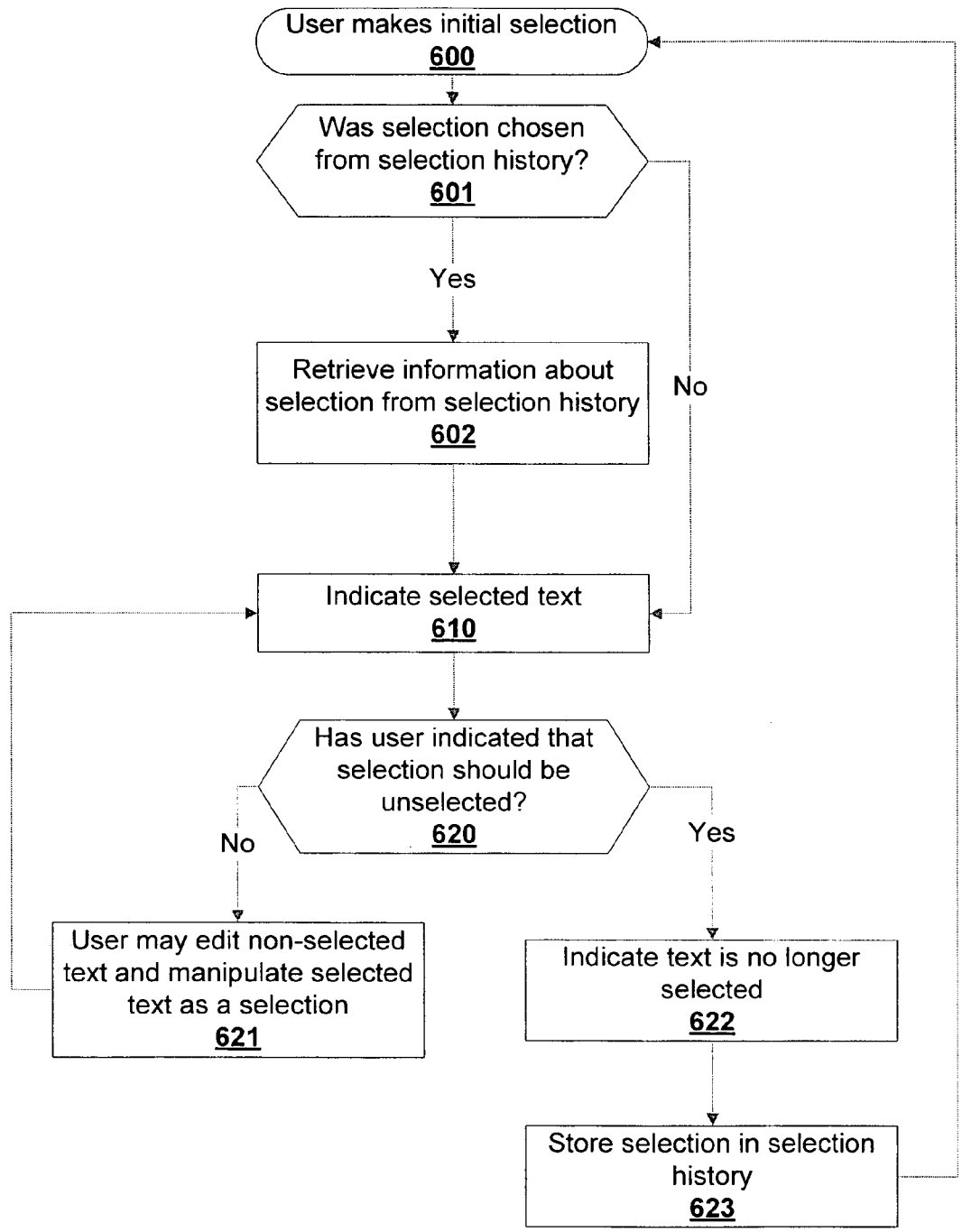

The text selection utility or the program of which it is a part may retain an indication of the selection. For example, a program may retain information about the selection in short-term memory. The program may retain information and continue displaying the selection until the user indicates that it is no longer desired. For example, referring to FIG. 6, the user may make and complete an initial selection 600. Such a selection may occur, for example, by clicking a mouse button while the mouse pointer is positioned within an area of text, dragging the mouse to highlight text, and releasing the button when the desired text has been highlighted. Other techniques are known in the art. The selection may be a previously-made selection, chosen from a selection history 601. If so, the system may retrieve stored information about the selection 602, such as the start and end points and the specific text included in the selection. The user may then choose an insertion point outside the selected text 610. For example, the user may position the mouse pointer within a non-selected region of text and click a button to move the cursor to that location. In some embodiments of the present invention, the program may continue to indicate the selection 610. That is, the program will retain the selection and allow for use of the highlighted text as a selection by the user. The user may edit text within or outside of the selection. The selection may still be manipulated by the user 621 after a new insertion point has been indicated.

Once the user no longer desires the selection to remain selected, he may indicate so 622. The program may determine whether such an indication has been made 620, for example by monitoring an input device for a known response. For example, the indication may comprise making a new selection as described above. In this embodiment, the user may click a mouse button while the mouse pointer is outside the text of the initial selection, drag the mouse to highlight text, and release a mouse button to complete the selection. The program may store the new selection. The program may indicate to the user that the previously-selected text is no longer selected, for example by removing highlighting. When a user indicates that the selection is no longer desired 622, the program may store the selection or information about the selection in a selection history 623 as previously described. These stored selections are then available for the user to choose as an initial or subsequent selection 600.

Figure 7:
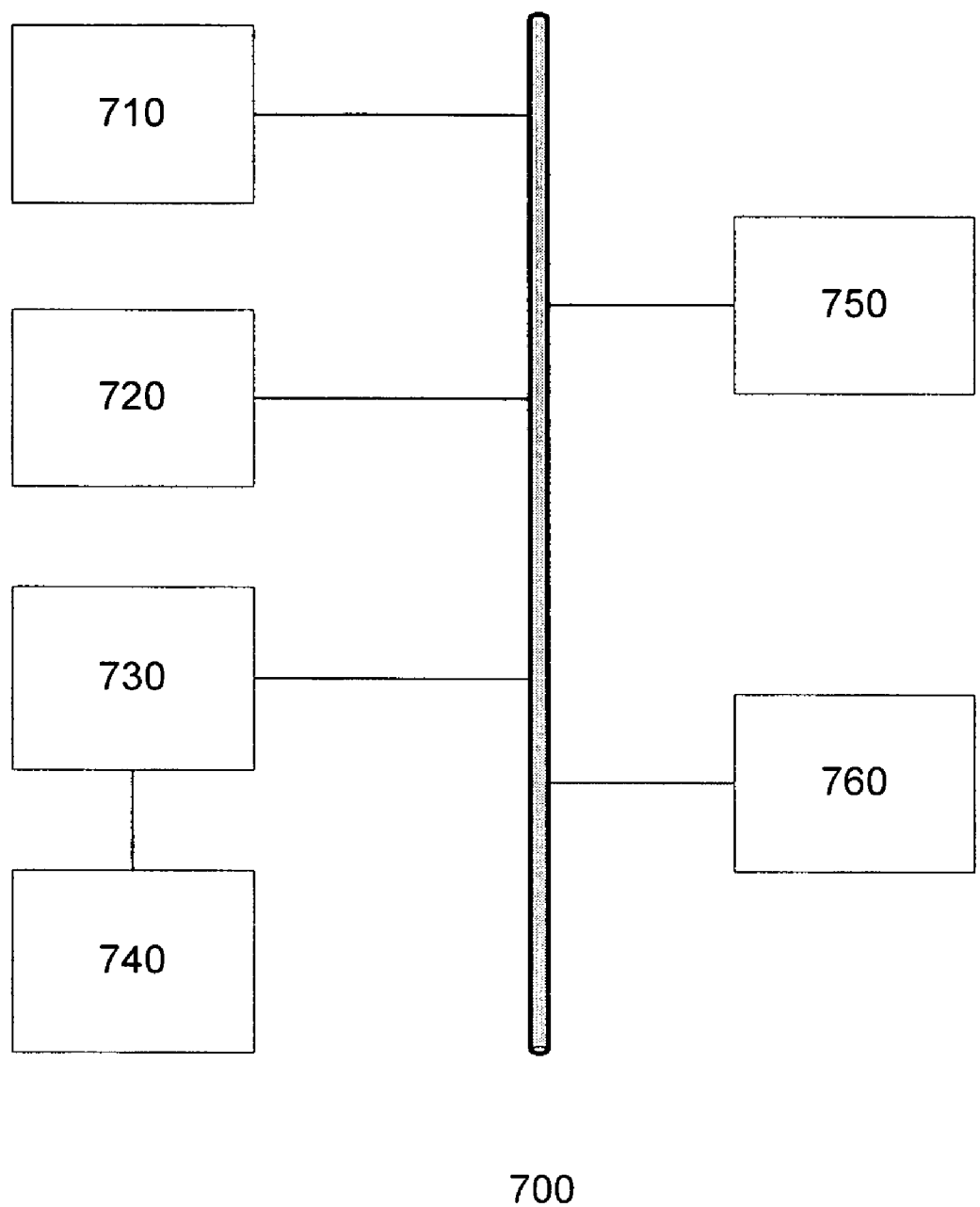
FIG. 7 is a block diagram of a system comprising the present invention.

Text selection may be controlled by the operating system. Such a configuration may be desirable to provide a consistent interface between applications. FIG. 7 illustrates an operating system according to one such embodiment of the present invention. Operating system 700 comprises device driver 710 for user input device 750, device driver 720 for display 760, and application handler 730. When a user makes a text selection within application 740 using input device 750, information about the text selection may be passed to operating system 700 by application handler 730 and device driver 710. Operating system 700 may indicate in display 760 that the selected text is selected using device driver 720. Operating system 700 may display graphical user interface elements to indicate possible manipulations of the selection on display 760. If a user interacts with the graphical user interface elements, operating system 700 may change the amount or specific text identified as selected on display 760.

The present invention is illustrated and described herein by specific examples. However, as will be appreciated by one of skill in the art, modifications and variations of the present invention are possible without departing from the spirit and scope of the invention and claims listed below.

I claim:

1. A computer-implemented method for selecting text comprising the steps of:
   in response to receiving a selection command from an input device, selecting a range of text within a document and entering a text selection mode;
   applying a text selection indicator to the selected text;
   displaying handle elements at start and end points of the selected text;
   responsive to operator interaction with the handle elements, altering an amount of text subject to the selection;
   editing the selected text and maintaining the applied text selection indicator during the editing of the selected text;
   storing a representation of the selection in a selection history stored on a computer-readable storage medium including a specific number of previous selections;
   displaying on a display device a list containing the previous selections in the selection history and a graphical representation indicating the status of each previous selection in the selection history, wherein the graphical representation indicating the status of each previous selection in the selection history is updated to reflect changes of the text within the document;
   merging multiple previous selections into a single selection if the multiple previous selections contain overlapping text; and
   terminating the text selection mode in response to a predetermined command from the input device;
   wherein an amount of the selected text remains selected after a user interacts with an unselected portion of text.

2. The method of claim 1, wherein the selected text includes text outside the normal flow of text between the start and end points of the selected text.

3. The method of claim 1, wherein the text indicated as selected excludes at least some text within the normal flow of text between the start point and the end point.

4. The method of claim 1, wherein the start and end points of the selection are in different organizational structures.

5. The method of claim 4, wherein the selected text excludes at least some text within the normal flow of text between the start and end points.

6. The method of claim 4, wherein the text indicated as selected includes at least some text outside the normal flow of text between the start and end points.

7. A computer system comprising:
   a processor;
   a user input device;
   a display device to display information content;
   an application handler stored on a computer-readable storage medium and executed by the processor to define graphical user interface elements in response to user commands from an application, and
   an operating system stored on the computer-readable storage medium and executed by the processor, the operating system to perform the steps of:
   responsive to a text selection operation displaying a display attribute on the display device identifying the selected text as selected and displaying handle elements at start and end points of the selected text, entering a text selection mode;
   editing the selected text and maintaining the display attribute during the editing of the selected text;
   storing a representation of the selection in a selection history including a specific number of previous selections;
   displaying on the display device a list containing the previous selections in the selection history and a graphical representation indicating the status of each previous selection in the selection history, wherein the graphical representation indicating the status of each previous selection in the selection history is updated to reflect changes of the text within the document;
   merging multiple previous selections into a single selection if the multiple previous selections contain overlapping text;
   responsive to user interactivity with the handle elements changing an amount of text identified as selected, and continuing to identify the selected text as selected until directed to do otherwise by a user; and
   terminating the text selection mode in response to a predetermined command from the input device.

8. A computer-readable storage medium containing program instructions for execution on a processor, which when executed by the processor, cause the processor to perform the steps of:
   responsive to operator input, selecting a segment of text;
   entering a text selection mode;
   applying a text selection indicator to the selected text;
   displaying handle elements at start and end points of the selected text;
   editing the selected text and maintaining the applied text selection indicator during the editing of the selected text;
   storing a representation of the selection in a selection history including a specific number of previous selections;
   displaying a list containing the previous selections in the selection history and a graphical representation indicating the status of each previous selection in the selection history, wherein the graphical representation indicating the status of each previous selection in the selection history is updated to reflect changes of the text within the document;
   merging multiple previous selections into a single selection if the multiple previous selections contain overlapping text; and
   responsive to operator interaction with the handle elements,
   changing the amount or portion of text selected as directed by the operator interaction;
   maintaining the selection while allowing a user to perform operations on unselected text; and
   terminating the text selection mode in response to a predetermined command from the input device.

9. The method of claim 7, wherein the selected text includes text outside the normal flow of text between the start and end points of the selected text.

10. The method of claim 7, wherein the text indicated as selected excludes at least some text within the normal flow of text between the start point and the end point.

11. The method of claim 7, wherein the start and end points of the selection are in different organizational structures.

12. The method of claim 8, wherein the selected text includes text outside the normal flow of text between the start and end points of the selected text.

13. The method of claim 8, wherein the text indicated as selected excludes at least some text within the normal flow of text between the start point and the end point.

14. The method of claim 8, wherein the start and end points of the selection are in different organizational structures.

* * * * *